United States Patent [19]

Policelli

[11] Patent Number: 4,813,715
[45] Date of Patent: Mar. 21, 1989

[54] END CONNECTORS FOR FILAMENT WOUND TUBES

[75] Inventor: Frederick J. Policelli, Salt Lake City, Utah

[73] Assignee: Hercules Incorporated, Wilmington, Del.

[21] Appl. No.: 843,425

[22] Filed: Mar. 24, 1986

[51] Int. Cl.⁴ .............................................. F16L 39/02
[52] U.S. Cl. .................................... 285/149; 285/250; 138/109
[58] Field of Search ............... 285/149, 250, 255, 246, 285/247, 387, 55, 353, 384, 334; 138/109, 132

[56] References Cited

U.S. PATENT DOCUMENTS

| | | | |
|---|---|---|---|
| 1,954,989 | 4/1934 | Eastman | 285/149 |
| 2,809,056 | 10/1957 | Kaiser | 285/149 |
| 3,373,243 | 3/1968 | Janowiak et al. | 285/250 X |
| 4,126,157 | 11/1978 | Roest | 285/149 X |
| 4,143,892 | 3/1979 | Murphy et al. | 285/149 |
| 4,275,769 | 6/1981 | Cooke | 285/149 X |
| 4,530,379 | 7/1985 | Policelli | 285/149 X |

FOREIGN PATENT DOCUMENTS 1277682 10/1961 France ............................... 285/149

Primary Examiner—Thomas F. Callaghan
Attorney, Agent, or Firm—Edmund C. Ross, Jr.

[57] ABSTRACT

End connectors of filament wound tubes are disclosed. The end connector uses an upset region at the end of the filament wound tube as a base in mounting a threaded retaining ring around the tube. The retaining ring is threaded to a housing mounted also around this upset region. The housing carries means for connecting the filament wound tube to another body and forming a pressure seal between the liner (optional) of the tube and the tip end of sleeve inserted beneath the upset region.

6 Claims, 1 Drawing Sheet

END CONNECTORS FOR FILAMENT WOUND TUBES

BACKGROUND OF THE INVENTION

Field of Use

This invention relates to filament winding and, more particularly, to filament wound tubes that are connectable with each other. This invention, still more particularly, relates to connecting tubes that are adapted to transmit torsional as well as radial and axial forces and, accordingly, are useful in oil field drilling pipe, drive shafts for transmitting rotary power and suspension components for heavy ground vehicles.

Filament winding is a well known technique for making composite tubes using high strength filaments such as carbon (graphite) fiber and thermosettable resin. Compared to tubes made of metal such as steel, the resultant filament wound tubes are considerably lighter in weight, have equivalent strength and generally have better fatigue resistance. Moreover, the tubes do not corrode.

When a composite tube is to be used in a torque transmitting application, however, the tube needs to be connected to another body. A variety of connectors have been proposed in the prior art including, for example, the use of rivets, pins and the like which are inserted through holes drilled in the pipe.

Cutting holes in a composite tube is not always advantageous. For example, in oil field drilling pipe, the tube needs to be impermeable to highly pressurized fluids and effective sealing of the holes in the pipe is difficult. Moreover, when significant torsion and bending loads are applied to the tubes having such pins, rivets and the like, these fasteners undergo significant loads and may break or otherwise cause excessive wear around the holes in the composite tube.

Objects of the Invention

It is an object of this invention to provide a low cost, high performance connecting tube that has highly reliable means for connection.

It is an object of this invention to provide a connecting composite tube which can transmit very high axial forces in addition to high torsional forces and internal pressure.

It is an object of this invention to provide a connecting tube for use in applications such as oil field drilling pipe, shafts that transmit rotary power and suspension components for heavy ground vehicles.

Brief Summary of the Invention

A hollow, connecting tube having a longitudinal axis that extends centrally within the tube along the length thereof, the tube comprising a filament wound tubular body having a longitudinal axis that is coincident with the tube axis, the tubular body having (a) an end section, a body section and a ramp section that is between the end section and the body section wherein filaments of the tubular body are high strength and extend from the end section through the ramp section to a location within the body section remote from the ramp section, (b) inner dimensions that are larger in the end and ramp sections than in the body section, the ramp section having inner dimensions increasing along the longitudinal axis toward the end section and (c) outer dimensions that are larger in the end and ramp sections than in the body section, the ramp section having outer dimensions increasing along the longitudinal axis toward the end section. Connecting members of the tube are a sleeve having first and second sleeve ends and inner dimensions substantially equal to inner dimensions of the body section, the first sleeve end having outer dimensions increasing along the longitudinal axis so as to permit the first sleeve end to fit within the tubular body beneath the ramp section and the second sleeve end having outer dimensions corresponding substantially to inner dimensions of the end section so as to permit the second sleeve end to fit within the tube body beneath the end section; a retaining ring having (a) an outer surface with a threaded portion and a gripping portion and (b) an inner surface with a sliding portion and a ramp portion, the sliding portion being beneath that part of the threaded portion adjacent the gripping portion and the ramp portion being beneath that portion of the threaded portion remote from the gripping portion; and a housing threaded to the threaded portion of the retaining ring, extending around the end section of the tubular body including around the tip of the end section that is away from the ramp section, and carrying means for connecting the connecting tube to another tubular body. In embodiments of the connecting tube that are used as oil field drilling pipes, the connecting tube further comprises a liner within the tubular body on the inside surface thereof and extending between the tip of the end section and the housing.

DETAILED DESCRIPTION OF PREFERRED EMBODIMENTS

Figure 1:
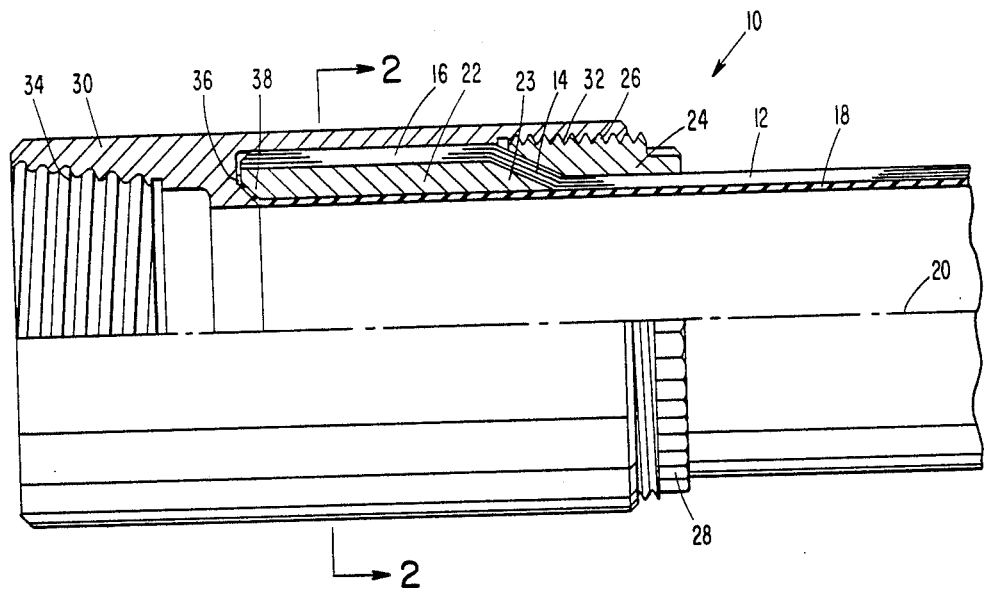
FIG. 1 shows an end of the connecting tube of this invention. The end is partially in section.

Tube 10 of FIG. 1 is made by steps including winding high strength filaments, (e.g. carbon, glass, boron or other fiber) around a mandrel. The filaments are coated with thermosetting resin (e.g. epoxy or vinyl ester resin) and cured to form the filament wound portions of tube 10.

The filament wound portions of tube 10 are body section 12, ramp section 14, end section 16 and the other end and ramp sections (not shown). The winding of body section 12, ramp section 14 and end section 16 is completed in a single operation and filaments preferably extend in tube 10 continuously from end to end. The angle these filaments lie relative lines parallel to axis 20 of tube 10 determine its axial, bending and torsional resistance as well as its burst pressure. The particular angles chosen for winding, accordingly, are a matter of preference except that the angles in ramp and end sections 14, 16 will be less than about 80° in a preferred fabricating technique of this invention.

Figure 2:
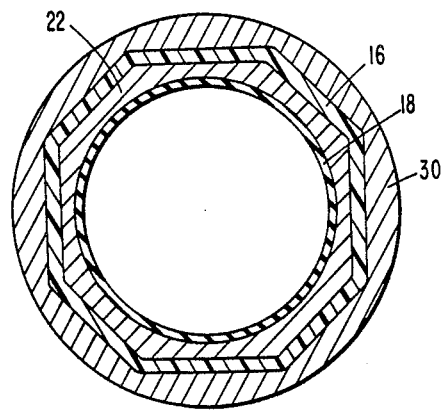
FIG. 2 shows a section of the tube in FIG. 1 taken around 2—2.

Body section 12 is generally cylindrical and has a cross-section which may be circular. End section 16, as shown in FIG. 2 has a cross-section which has a convex polygonal shape. Ramp section 14 has the form of a truncated cone with a diameter that ramps up from the diameter of the body section 12 to intersect the polygon of the end section 16.

Tube 10 has liner 18 made of elastomeric or like protecting and sealing material. Liner 18 is particularly useful in oil field drilling applications to permit tube 10 to carry high pressure fluids which are at elevated temperatures.

Tube 10 also have sleeve 22 which fits within ramp and end sections 14, 16. Sleeve 22 may be made of metal or composite and has an outer surface with is a convex polygonal shape like end section 16. The mating between the polygonal shapes of end section 16 and sleeve 22 permits the application or torque to tube 10 to be transmitted to body section 12. In additional to the polygonal shape of the outside surface of sleeve 10, a ramp portion 23 of sleeve 22 permits nesting of sleeve 22 beneath ramp section 14 of tube 10. Another connecting member of tube 10 is retaining ring 24. Ring 24 slides over body section 12 and has a ramped inner surface for engaging ramp section 14. On its outside surface, ring 24 has ring threads 26 and grips 28.

Housing 30 threads to ring threads 26 with housing threads 32. Housing 30, made of metal or composite, also has pipe threads 34 at its opposite end for connecting tube 10 to another threaded body. Threads 34 are conical to form a pressure type fit with the other threaded body which may be another body like tube 10.

The other end of tube 10 (not shown) has male threads so that a series of tubes like tube 10 can be connected end to end in forming the drill pipe.

Tube 10 is fabricated using conventional filament winding techniques in forming a pipe having a constant or substantially constant diameter. The filament winding mandrel, however, has ends that are expandable. The expandable ends comprise a rubber bladder which is expandable by introduction of fluid within the bladder. A mechanically expanding mandrel end may be used instead of the bladder.

The constant or substantially constant diameter tube is wound so that the filaments wound around the expandable end portions are at angles relative lines parallel to the mandrel central axis which are helical, preferably between a very small angle such as 10° in absolute value to 80° in absolute value, to allow for expansion. Prior to expansion, however, the retaining rings, e.g. ring 24 (and other ring not shown) are slipped around body section 18. Then, two molds each having a convexly shaped polygonal cavity, are respectively placed around an end of the filament wound tube. The ends of the mandrel are then expanded and the composite cured to form end, ramp and end sections 12, 14 and 16, ramp and body sections 14, 16 being cured while being forced into the mold. The mandrel is then removed from within the cured composite tube and sleeve 22 and ring 24 (and the other sleeve and ring, not shown) are slid into place. Then liner 18 is inserted into tube 10 and housing 30 threaded to ring 24. Housing 30 is threaded to ring 24 sufficiently tight to compress the tip end 36 between housing 30 and the open end 38 of sleeve 22 to form a pressure tight seal. In addition, sleeve 22 is forced against ramp section 14 and may be contoured to fit into the inside of ramp section 14.

What I claim and desire to protect by Letters Patent is:

1. A hollow, connecting tube having a tube axis that extends centrally within said tube along the length thereof, said tube comprising:
    a filament wound tubular body having a longitudinal axis that is coincident with said tube axis, said tubular body having (a) an end section, a body section and a ramp section that is between said end section and said body section wherein filaments of said tubular body are of high strength and extend from said end section through said ramp section to a location within said body section remote from said ramp section, (b) inner dimensions that are larger in said end and ramp sections than in said body section, said ramp section having inner dimensions increasing along said longitudinal axis toward said end section and (c) outer dimensions that are larger in said end and ramp sections than in said body section, said ramp section having outer dimensions increasing along said longitudinal axis toward said end section;
    a sleeve having first and second sleeve ends and inner dimensions substantially equal to inner dimensions of said body section, said first sleeve end having outer dimensions increasing along said longitudinal axis so as to permit said first sleeve end to fit within said tubular body beneath said ramp section and said second sleeve end having outer dimensions corresponding substantially to inner dimensions of said end section so as to permit said second sleeve end to fit within said tube body beneath said end section;
    a retaining ring having (a) a outer surface with a threaded portion and a gripping portion and (b) an inner surface with a sliding portion and a ramp portion, said sliding portion being beneath that part of said threaded portion adjacent said gripping portion and said ramp portion being beneath that portion of said threaded portion remote from said gripping portion;
    a housing (a) threaded to said threaded portion of said retaining ring, (b) extending around said end section of said tubular body including around the tip of said end section that is away from said ramp section, and (c) carrying means for connecting said connecting tube to another tubular body.

2. The hollow connecting tube in accordance with claim 1, wherein said end section has a cross-section that is polygonal.

3. The hollow connecting tube in accordance with claim 2, wherein said filaments comprise carbon (graphite) fiber.

4. The hollow connecting tube in accordance with claim 3, wherein said filaments in said ramp and end sections are at angles, relative lines parallel said longitudinal axis, that are less than 80° in absolute value.

5. The hollow connecting tube in accordance with claim 4, wherein additional filaments in said body section are at angles, relative said longitudinal axis, that comprise angles between 80° and 89° in absolute value.

6. The hollow connecting tube in accordance with claim 5, wherein said tube has a liner that extends on the inside surface thereof around said longitudinal axis between the tip of said end section and said housing.

* * * * *